United States Patent [19]
Katoh

[11] Patent Number: 4,814,893
[45] Date of Patent: Mar. 21, 1989

[54] IMAGE PROCESSING SYSTEM WITH COORDINATION OF IMAGE AND RECORDING MATERIAL SIZE

[75] Inventor: Katsunori Katoh, Kawasaki, Japan

[73] Assignee: Canon Kabushiki Kaisha, Tokyo, Japan

[21] Appl. No.: 206,898

[22] Filed: Jun. 8, 1988

Related U.S. Application Data
[63] Continuation of Ser. No. 725,810, Apr. 22, 1985.

[30] Foreign Application Priority Data
Apr. 28, 1984 [JP] Japan .................................. 59-86893

[51] Int. Cl.⁴ .............................................. H04N 1/21
[52] U.S. Cl. ................................ 358/296; 355/14 SH; 358/287
[58] Field of Search ................... 355/14 R, 14 SH, 55; 358/256, 293, 287, 296

[56] References Cited
U.S. PATENT DOCUMENTS
| | | | |
|---|---|---|---|
| 4,302,098 | 11/1981 | Kan et al. ............................. | 355/55 |
| 4,417,282 | 11/1983 | Yamamoto ............................ | 358/296 |
| 4,439,790 | 3/1984 | Yoshida ............................ | 358/293 X |
| 4,504,916 | 3/1985 | Oka ................................... | 355/14 SH |
| 4,597,018 | 6/1986 | Sonobe et al. ....................... | 358/296 |
| 4,603,962 | 8/1986 | Dekura ............................ | 355/14 R X |

FOREIGN PATENT DOCUMENTS
| | | |
|---|---|---|
| 3019836A | 1/1982 | Fed. Rep. of Germany . |
| 3327270A | 2/1984 | Fed. Rep. of Germany . |
| 58-164369 | 9/1983 | Japan ................................. 358/287 |

*Primary Examiner*—Clifford C. Shaw
*Attorney, Agent, or Firm*—Fitzpatrick, Cella, Harper & Scinto

[57] ABSTRACT

An image processing system comprises: an image reader to read image information consisting of one or a plurality of pages stored in a storage medium such as a photodisc or floppy disk; an image size recognizing device for recognizing the image size of the image information; a recorder such as a laser beam printer to record the image information on a recording paper; recording paper size recognizing device for recognizing the recording paper size set in the recorder; discriminating device for discriminating the presence or absence of the recording paper of the size suitable for the image size by comparing the image size with the recording paper size; and a CRT display device to display the corresponding paper size when the recording paper suitable for the image size is not set. With this system, the operator can know the required paper size before the recording operation. The image information is printed for every image size on the recording paper which is automatically selected in accordance with the original image size. Thus, an annoyance in exchange of the papers can be reduced and operation efficiency can be raised.

17 Claims, 9 Drawing Sheets

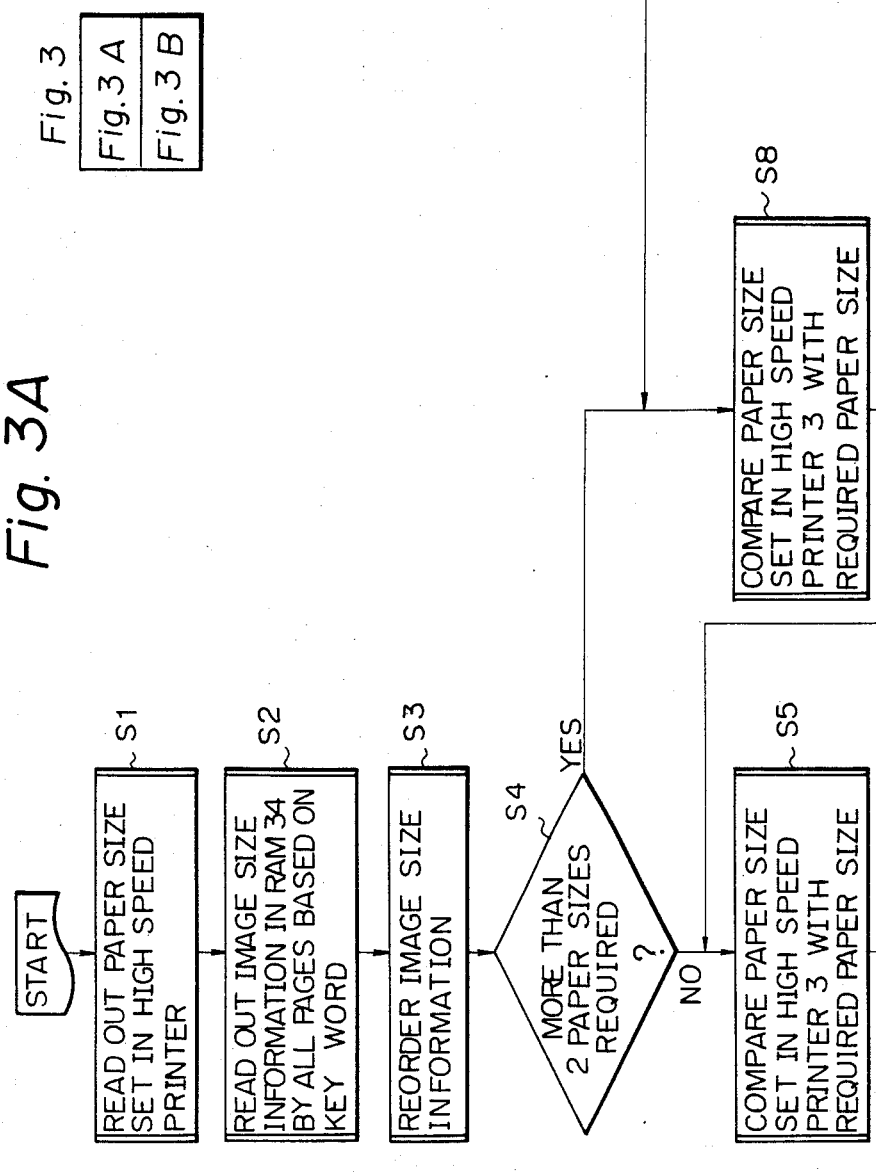

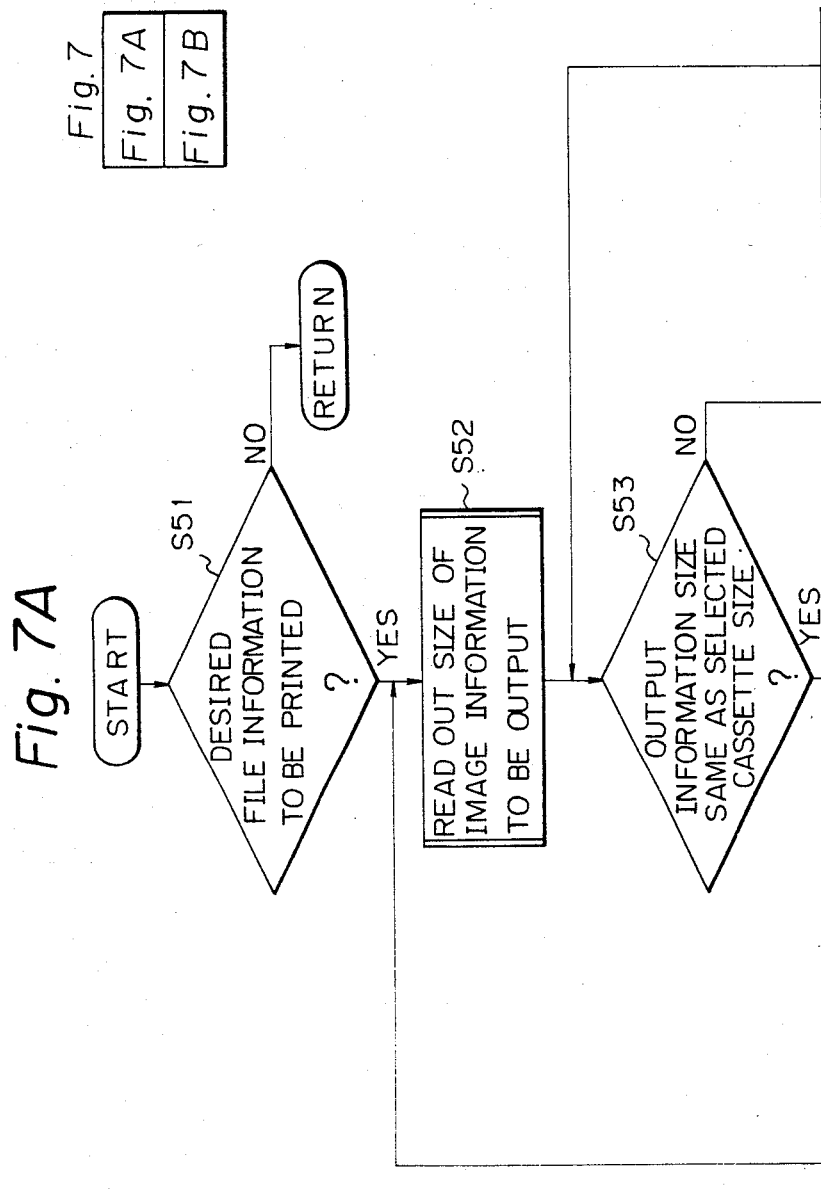

IMAGE PROCESSING SYSTEM WITH COORDINATION OF IMAGE AND RECORDING MATERIAL SIZE

This application is a continuation of application Ser. No. 725,810 filed Apr. 22, 1985.

BACKGROUND OF THE INVENTION

1. Field of the Invention

The present invention relates to an image processing system which reads out image information from a storage medium and records it.

2. Description of the Prior Art

Recently, there have become known the recording of an image on the basis of an image signal derived by photo-electrically reading an image of an original and the transmission of such an image signal to a remote place. In the case of handling image information as an electric signal, it is possible to constitute what is called a network in which a plurality of apparatuses which deal with the image signal are connected through transmission lines and an output from an arbitrary apparatus can be transferred to an arbitrary other apparatus.

In such a system, information in which a set of files is constituted by originals having a plurality of pages is ordinarily handled. In addition, in many cases, pages of several original sizes are mixed together in a plurality of pages. In the case of continuously performing the operation to read out image information in which such pages of several kinds of original sizes are mixed and constitute a set of file from a photo disc and thereby to form an image, the image forming operation can be continuously performed when recording papers of the size suitable for the original size have been prepared in an image forming apparatus (printer). However, if the recording papers of the proper size are not prepared, either a method whereby the image forming operation is stopped or one whereby the image is formed on the preset recording paper has to be adopted. Therefore, there is the annoyance that the operator must always monitor the system when continuous images are formed.

SUMMARY OF THE INVENTION

It is an object of the present invention to eliminate the foregoing drawback.

Another object of the invention is to improve an image processing system.

Still another object of the invention is to provide an image processing system which can read out information regarding the size from a storage medium in which image information has been stored.

Still another object of the invention is to provide an image processing system in which when image information is read out from a storage medium and is recorded, operation efficiency can be raised such that the necessary paper size can be known prior to the recording operation.

Still another object of the invention is to provide an image processing system which can raise operation efficiency by automatically selecting the recording paper in accordance with the image size of the image information read out from a storage medium.

Still another object of the invention is to provide an image processing system which can raise an operation efficiency by changing a magnification and recording the image information in accordance with a size of image of the image information read out from a storage medium.

Still another object of the invention is to provide an image processing system in which image information is read out from a storage medium for every image size and is recorded, thereby reducing the annoyance of having to exchange the recording papers of different sizes and enabling operation efficiency to be raised.

Other objects and features of the present invention will become apparent from the following detailed description with reference to the accompanying drawings.

DETAILED DESCRIPTION OF PREFERRED EMBODIMENT

One embodiment of the present invention will now be described in detail hereinbelow with reference to the drawings.

Figure 1:
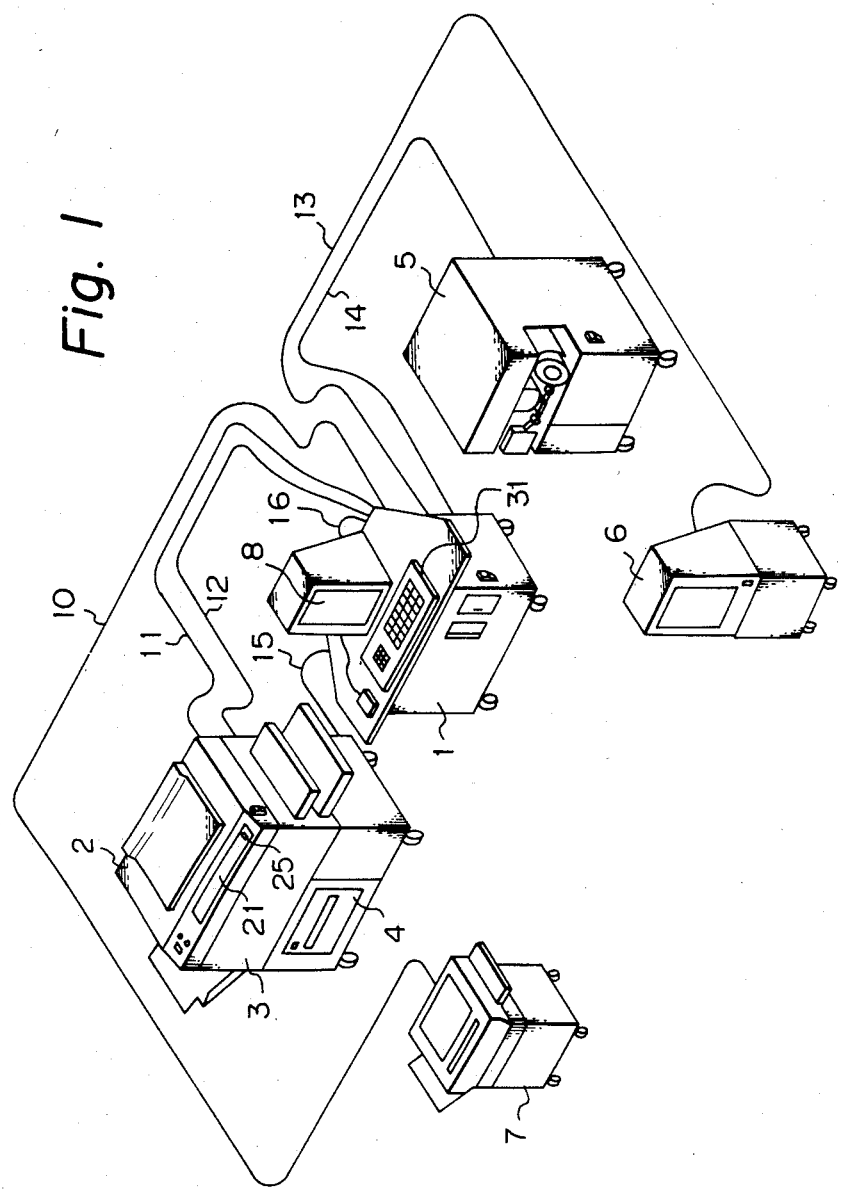
FIG. 1 is an external connection view of an image processing system to which the present invention is applied.

FIG. 1 is an external connection view of an image processing system to which the present invention is applied. A reference numeral 1 denotes a control section (called a work station) comprising a microcomputer for control of the system, an internal memory which is constituted by a RAM, ROM or the like, and an external memory which is constituted by a floppy disk or cartridge disk or the like. A numeral 2 is an original reader for converting document information of an original put on an original plate in an input section of a digital copier to an electric signal by means of an image pickup device such as a CCD or the like. A numeral 3 is a high speed printer such as a laser beam printer or the like for recording an image on a recording material on the basis of the information converted to the electric signal in the input section of the digital copier. A numeral 4 is an image file which has a storage medium such as a photodisc or photo magnetic disc or the like and a great quantity of image information can be stored in or read out from this image file. A microfilm file 5 has a microfilm research section and a microfilm reader section for converting the image information in the researched microfilm to an electric signal by means of an image pickup device. A numeral 6 is a high resolution soft display having a photosensitive belt in which a photoconductive layer is formed on a transparent, conductive band-like bases substrate. This soft display uses a laser beam modulated in response to the input image signal to illuminate the photoconductive layer through the base substrate, thereby forming on the photoconductive layer an electrostatic latent image corresponding to the brightness of the image light. Then, the soft display develops this latent image by use of the toner (developer) having conductivity and magnetism held on a toner carrier, thereby forming a display image. A numeral 7 is a printer apparatus such as a laser beam printer or the like similar to the printer 3. The printer 7 is a small and, as compared with the printer 3, low-speed printer and may be installed as necessary. A numeral 8 is a CRT apparatus for displaying the image information which was photo-electrically read out by input scanners (readers) or the digital copier and microfilm file, or control information of the system or the like. Numerals 10 to 16 are cables by which the respective input-output apparatuses are electrically connected; 31 is a keyboard provided in the control section 1 and the operation command or the like of the system is executed by operating the keyboard 31; and 21 is an operation panel to command the operation of the digital copier. The operation panel 21 has setting keys to set a copy quantity, copy magnification and the like, a copy key 25 to instruct the start of copy, a numeric value indicator, and the like.

Figure 2:
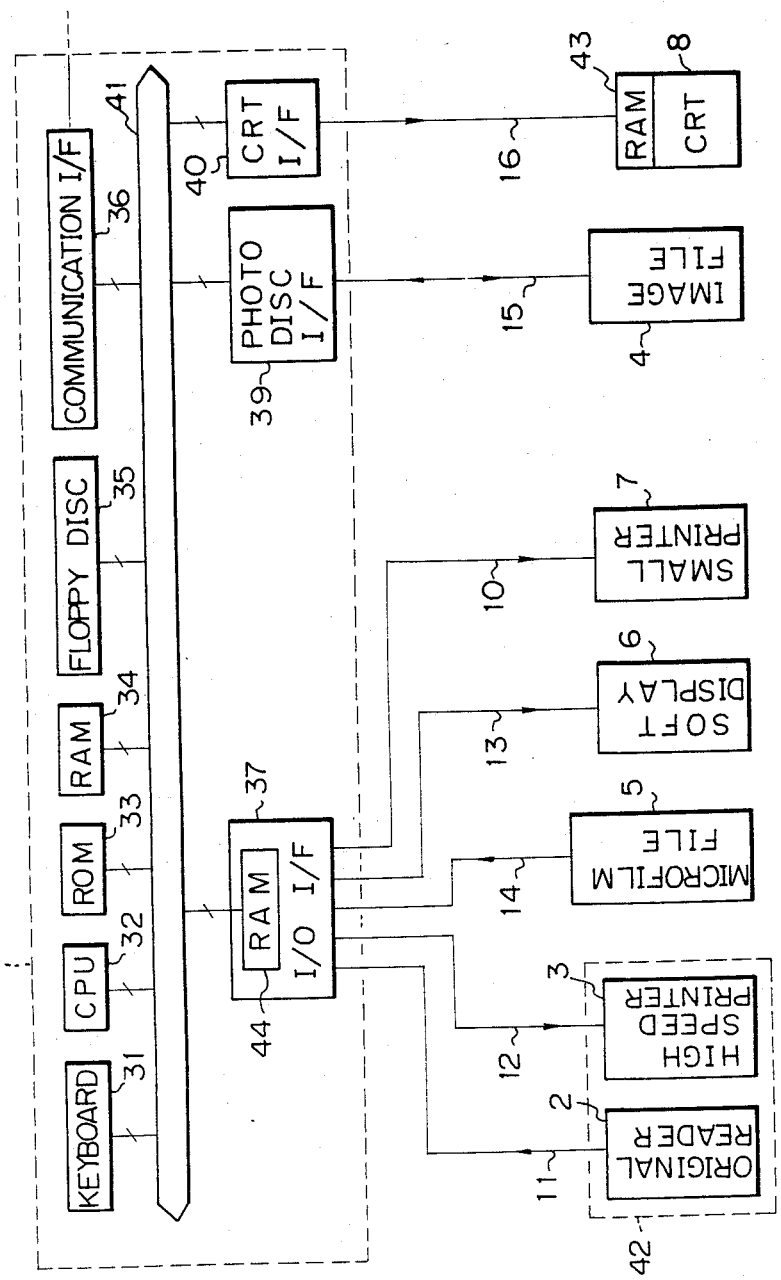
FIG. 2 is a block diagram showing a circuit arrangement of an image processing system.

FIG. 2 is a block diagram showing a circuit arrangement of the image processing system shown in FIG. 1. The respective blocks corresponding to those shown in FIG. 1 are designated by the same reference numerals. Each block in the control section 1 will be first described.

A numeral 31 denotes a keyboard corresponding to the keyboard 31 shown in FIG. 1 and the operator inputs an operation instruction of the system by the keyboard 31; 32 is a central processing unit (CPU) consisting of a microcomputer (for instance, Model 68000 made by Motorola Semiconductor Co., Ltd.); 33 a read only memory (ROM) in which a control program of the system has been preliminarily stored and the CPU 32 performs the control operation in accordance with the program stored in the ROM 33; 34 a random access memory (RAM) which is mainly used as a page memory to store the image signals which are transmitted and received among working memories in the CPU 32 and respective input-output sections; 35 an external memory consisting of a floppy disk in which the control program of the system, data base to research the image from the image file which will be mentioned later, and the like are stored; and 36 a communication interface which makes it possible to transmit and receive information between the system and another similar system or terminals by use of communication lines such as a local area network or the like.

A numeral 37 is an input-output interface to execute the transmission and reception of information between the control section 1 and each input-output section; 39 is a photo disc interface for transmission and reception of information with the image file 4; 40 a CRT interface for transmission and reception of information of the CRT 8; and 41 is a sixteen-bit bus through which the signals of the respective blocks in the control section 1 are transferred.

Numerals 11 to 16 are the cables to electrically connect the respective input-output apparatuses as mentioned before. The control signals and image signals are transmitted through these cables. An arrow shown in FIG. 2 for each cable represents a flow of the image signal. In addition, the flow of the control signal is bidirectional on the cable.

As will be apparent from the diagram, the original reader 2 and high speed printer 3 of a digital copier 42, the microfilm file 5, soft display 6, and small-sized printer 7 are connected to the Input-output interface 37 through the cables 11 12, 14, 13 and 10, respectively. The image file 4 and CRT 8 are connected to the respective interfaces 39 and 40 in the control section 1 through the cables 15 and 16, respectively. The CRT 8 is equipped with a RAM 43 for display which stores the image information to be displayed. On the other hand, the image signal which is inputted or outputted by the input-output interface 37 is a serial signal and the information on the bus 41 of the control section 1 is a parallel signal. Therefore, a serial-to-parallel register to take in the image signal and a parallel-to-serial register to output the image signal are provided for the I/O interface 37.

The image signal which is outputted by the original reader 2 or microfilm file 5 is inputted to the I/O interface 37 in the control section 1 on a line-by-line basis. The I/O interface 37 converts the serial image signal inputted to a parallel signal of sixteen bits and then outputs it onto the bus 41. The image signal outputted onto the bus 41 is sequentially inputted into an image area in the RAM by one page. The image signal stored in the RAM 34 in this way is again outputted onto the bus 41 and then it is outputted to the outside through the communication interface 36, or is sent to the image file 4 through the photodisc interface 39 and is stored on the photodisc, or is selectively transmitted to the high speed printer 3, soft display 6 or small-sized printer 7 through the I/O interface 37, so that an image is formed.

On the other hand, the image signal read out from the photodisc of the image file 4 is once stored into the RAM 34 and thereafter it is selectively transmitted to the high speed printer 3, soft display 6 or small-sized printer 7 through the I/O interface 37.

In addition, the management information for the image information stored in the image file 4 has been stored on a photodisc or the floppy disk 35. Desired image information is researched on the basis of this management information and the keyboard information inputted from the keyboard 31.

The CPU 32 executes the control regarding the above-mentioned transmission of the image signal in accordance with the operation command which is inputted by the operator by use of the keyboard 31.

Figure 3B:
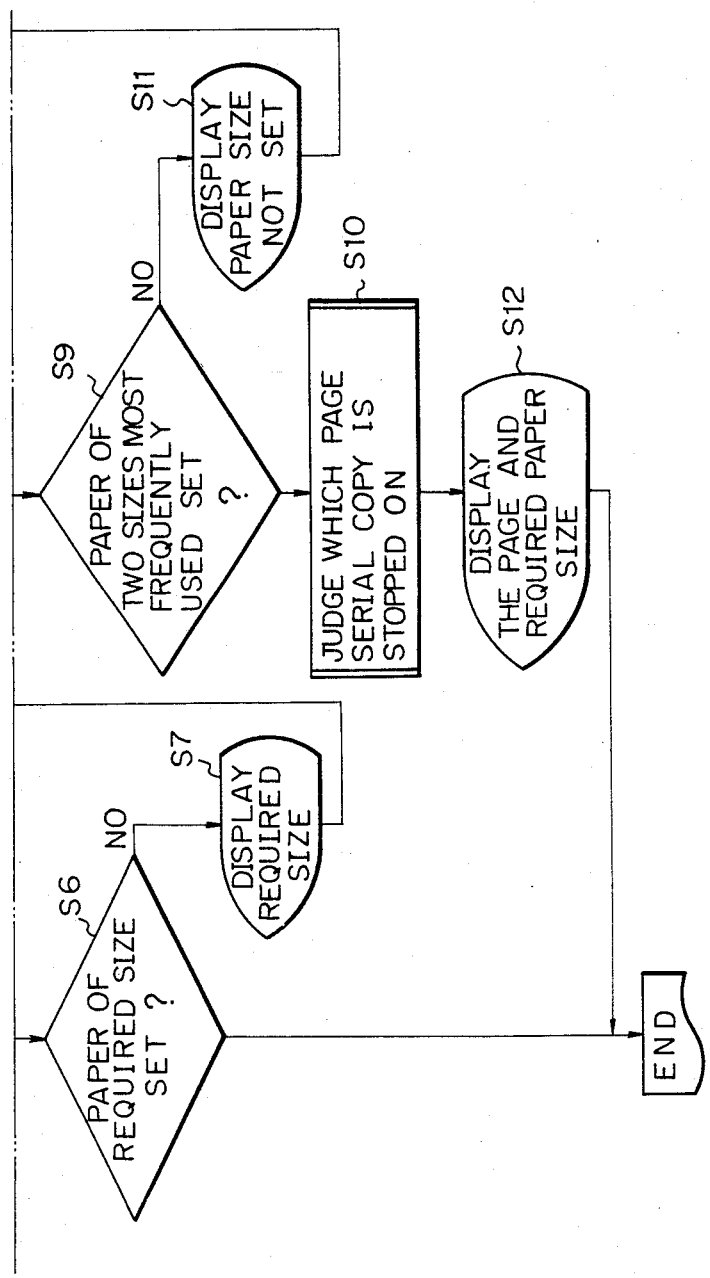
FIG. 3, consisting of FIGS. 3A and 3B, is a sequence flowchart for discrimination of papers.

FIG. 3 is a flowchart for the processes which are performed by the CPU 32 before the operation is started in the case where a command to continuously form images of the image information consisting of a plurality of pages is instructed from the keyboard.

In the foregoing system, when the image information of one page is stored onto a photodisc, the image size information indicative of the size of original of this image information is stored together with the keyword information (management information) that is stored into a predetermined position of the disc. Further, in case of the image information consisting of a plurality of pages, the image size information of all pages can be also together recorded in the head page.

In case of researching the image information consisting of a plurality of pages stored on the photodisc in this way, the first page is first displayed on the CRT. The keyword information is read out from the photodisc by the image file 4 together with the image information of the first page and is stored into the RAM 34 through the photodisc interface 39 and bus 41. Through the keyboard 31, the operator can instruct a command to successively perform the operation such that the image information consisting of a plurality of pages is read out from the photo disc one page by one and is once stored into the RAM 34 and the image information is outputted to the high speed printer 3.

The operation of the CPU 32 will then be described hereinbelow with reference to the flowchart in FIG. 3.

First, the CPU 32 detects (in this embodiment, two kinds of) sizes of the papers which are set at present in the high speed printer 3 by a well-known method such as microswitches or the like representing the paper sizes in the cassettes in which the recording papers were loaded and receives these paper sizes as paper size information. These two kinds of paper size information are stored into the RAM 34 (step S1).

Next, the information indicative of the original sizes of the image information (image size information) is read out by all pages from the keyword information that was read out from the photodisc and was stored in the RAM 34 (step S2) These image size information are recorded in accordance with the sequence from the image size at which the number of pages is largest, namely, in accordance with the sequence from the pages which are most frequently used (step S3). Then, a check is made to see if the number of kinds of paper sizes which are needed when the images of all pages of one file are formed is more than two or not (step S4). If the number of kinds of required paper sizes is two or less, a check is made to see if the recording on the papers of the sizes which are prepared at present in the high speed printer 3 can be performed or not from the image size information (step S5). If the recording is possible, that is, if the papers of the required sizes are prepared in the high speed printer 3, the images can be continuously formed; therefore, the discriminating operation of the paper size is finished (step S6). If the recording is impossible, namely, if the papers fitted for the original size which is needed to form the images are not prepared in the high speed printer 3, the necessary paper size is displayed by the CRT 8, thereby informing it to the operator (step S7). The operator then re-prepares the proper papers on the basis of this instruction. The CPU 32 repeats the operation in this flow until the suitable papers are set.

On the other hand, if there are three or more kinds of required paper sizes, a comparison is made between the papers suitable for the first and second image sizes and two kinds of paper sizes which are prepared at present in the high speed printer 3 in accordance with the sequence from the image size at which the number of pages is largest, in other words, in accordance with the sequence from the pages that are most frequently used (steps S4 and S8). Then, a check is made to see if the papers suitable for the first and second image sizes based on the sequence from the largest number of pages are prepared in the high speed printer 3 or not (step S9). If the papers prepared in the high speed printer 3 are not the papers fitted for the first and second image sizes in order from the largest number of pages, the papers which are not prepared are displayed on the CRT 8, thereby informing the operator of it (step S11). The operator may set the necessary papers on the basis of this instruction. If two kinds of papers which are prepared at present in the printer 3 are the papers suitable for the first and second image sizes in order from the largest number of pages, a check is made to see on which page the serial image forming operation has to be stopped because the proper papers will have been used up during the copying operation (step S10). Then, the page on which the serial image forming operation is stopped and the necessary paper size are displayed, thereby informing them to the operator (step S12). The, the operation to select the papers fitted to the image size is finished. Thereafter, the copying operation is started. Due to this, there is no need to exchange the papers during the serial copying operation of a plurality of pages and the number of exchanging times can be reduced, so that an annoyance in operation can be reduced.

Upon completion of the foregoing operation, the CPU 32 starts the serial image formation of the image information in which one set is constituted by a plurality of pages. The CPU 32 first transmits the image information stored in the RAM 34 to the high speed printer 3, thereby forming the image. After completion of this image formation, the image information of the next page is read out from the photodisc and is stored into the RAM 34. After completion of the storage of this image information, the image is transmitted from the RAM 34 to the high speed printer 3 and thereby forming the image.

The serial images of a plurality of pages are formed by repeating the above-mentioned operation. In the case where there are two or less kinds of original sizes of the image information, during the serial image formation, the CPU 32 properly provides the information as to the paper size which is used to the high speed printer 3 in accordance with the required paper size and forms the image. Therefore, it is unnecessary for the operator to operate the system in the halfway, so that the annoyance in operation of the operator can be reduced. On one hand, even in case of three or more kinds of original sizes of the image information, if the papers of the suitable paper size are used up during the serial copying operation, it is indicated by the CRT 8, so that the copying operation can be continued by exchanging the papers.

Figure 4:
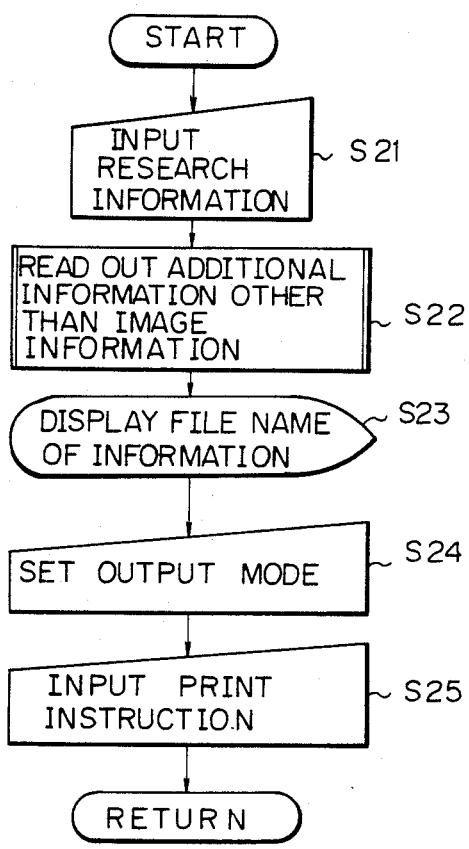
FIG. 4 is a flowchart showing the research procedure.

Referring now to FIG. 4, a flowchart for the operation of the research process is shown. First, the research information is inputted by the keyboard 31 to derive desired information (step S21). The additional information other than the image information is read out from the floppy disk 35 (step 22) and the file name or the like of the corresponding image information is displayed on the CRT 8 on the basis of the research information inputted (step 23). Then, the output mode is set with respect to which file information is printed or how many papers the image information is printed on or the like (step 24). Next, a print command is inputted (step 25). The information researched in accordance with this process is stored into the RAM 34. This process is performed before the operation shown in FIG. 3.

Figure 5:
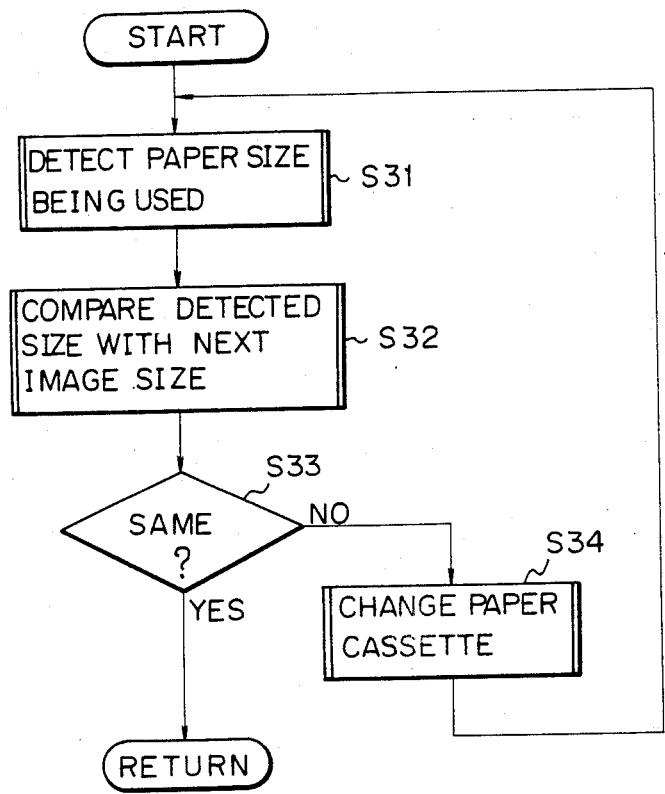
FIG. 5 is a flowchart showing the automatic paper selecting operation.

FIG. 5 shows a flowchart for the operation to automatically select the papers. First, the paper size whichis being used at present in the papers set in the printer is detected (step 31). Then, the detected paper size is compared with the paper size suitable for the image size of the image information of the next page to be printed (step 32) and a check is made to see if these sizes are the same or not (step 33). If they are different, the paper cassette to be selected is changed (step 34).

The number of kinds of paper sizes which can be set in the high speed printer 3 was set to two in the foregoing embodiment. However, it is not limited two. The invention can be also applied to the case where three or more kinds of paper sizes can be set or where only one kind of paper size can be set as in a small-sized printer. The invention can be also applied to the case of an arrangement whereby other image forming system using a similar image forming method is used on the basis of an electric signal.

In addition, if the papers of the proper paper size are not set, the papers are preliminarily exchanged or they are exchanged after temporary interruption of the copying operation in the foregoing embodiment. However, if the existing papers set in the printer can be used, the images can be copied on these papers without exchanging them. Further, it is also possible to variably magnify the image information to proper sizes and thereafter copy them in order to unify the paper size.

On one hand, the image size information may be a quantity of information of the images stored on the disc as well as the original size. Also, the recording paper size information may be also used in addition to the image size information.

Figure 6:
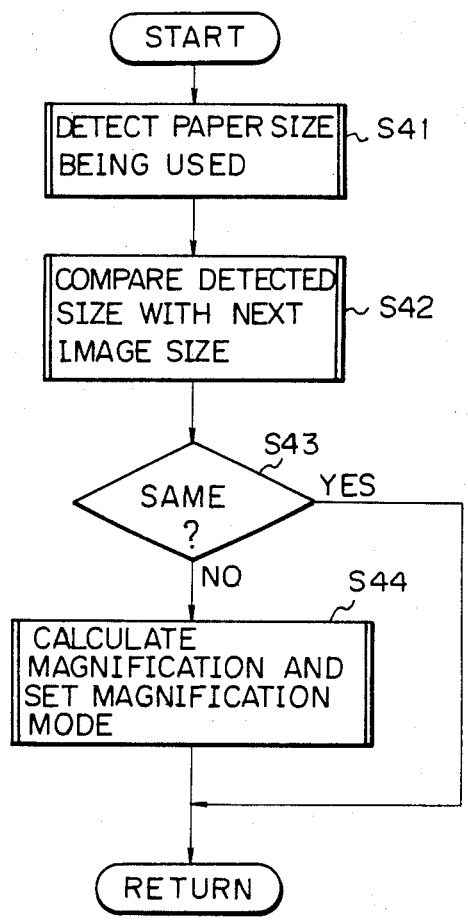
FIG. 6 is a flowchart showing the automatic variable magnification operation to unify the recording papers.

FIG. 6 shows the operation to unify the paper size using variable magnification. First, the paper size of the cassette being used at present in the papers which are set in the printer is detected (step 41). The detected paper size is compared with the paper size suitable for the image size of the image information to be printed next (step 42) and a check is made to see if these paper sizes are the same or not (step 43). If they are different, the copy magnification is calculated on the basis of the set paper size and paper size suitable for the image size and then the variable magnification output mode (regarding the position of the lens and scanning velocity) suitable for the result of calculation is set (step 44).

Next, the operation to output a single file information consisting of a plurality of pages for every image size will be explained.

First, when a command of continuous output of a single file information from the disc is issued, the management information of all pages is read out. The image size which is outputted from the first page is compared with the paper size of the cassette. In the case where the papers of the size suitable for the printer are prepared, the image information is outputted. Unless the papers of the proper size are prepared, no image information is outputted and the processing routine advances to the next page. This operation is sequentially performed until the final page. After completion of the outputting of the images of all pages, the processing routine is finished here. If the pages which are not outputted yet are still left, these pages and the required cassette size or the like are displayed on the CRT, thereby instructing the exchange of the cassette. After the proper cassette was set, the image information is outputted to the papers of the suitable paper size sequentially from the page of the smallest page number that is not outputted yet in a similar manner as the above-described procedure.

Figure 7B:
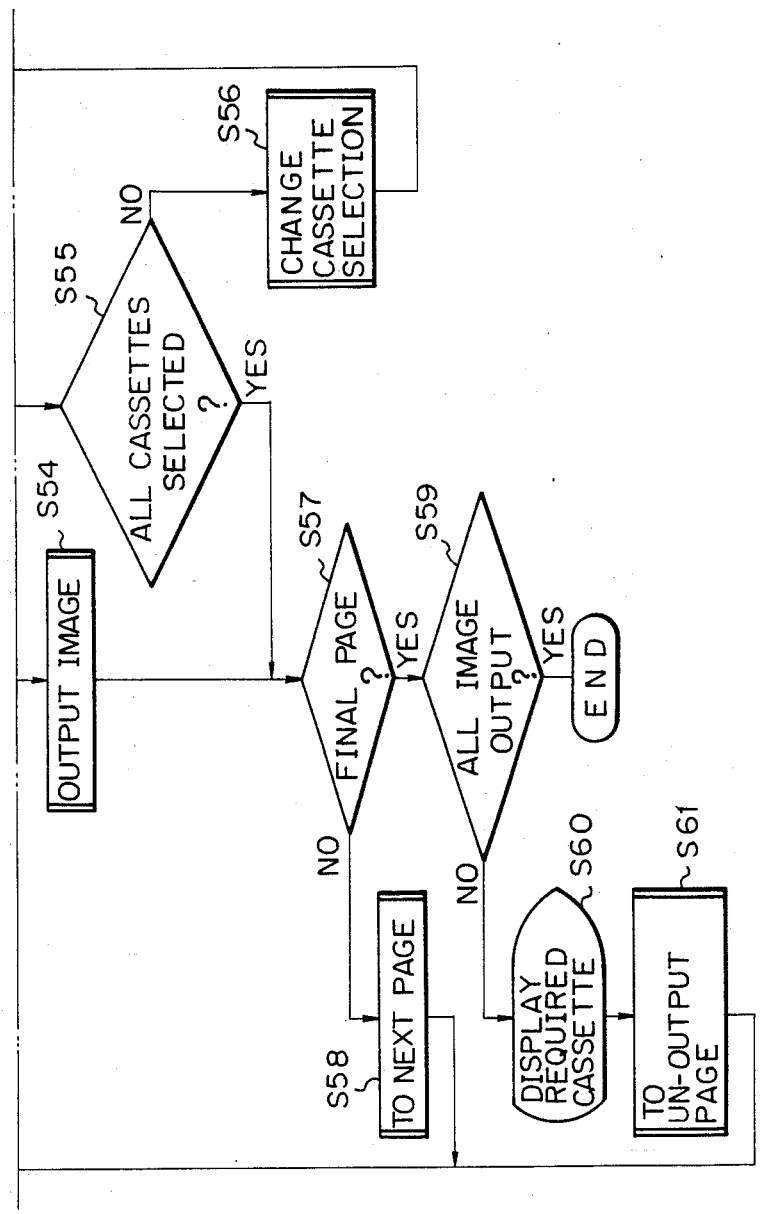
FIG. 7, consisting of FIGS. 7A and 7B, is a flowchart showing the operation to print for every image size.

Explanation will be further made with reference to FIG. 7. In the case where the research information is inputted and desired file information is researched, a check is made to see if a command to print this file information is issued or not (step 51). If this printing command is generated, the image size of the image information of the first page is read out (step 52) and a check is made to see if the paper size suitable for that image size coincides with the paper size of the selected cassette in the printer (step 53). If these paper sizes are the same, the image information is read out from the photodisc and is printed (step 54). If they are different, a check is made to see if all cassettes which had been set in the printer were selected for comparison of the paper size or not (step 55). If this selection regarding all cassettes was completed, the outputting is impossible in case of the cassette which is set at present, so that the processing routine advances to step 57. In the case where the selection with respect to all cassettes set in the printer is not finished in step 55, the cassette selection is changed (step 56) and the processing routine is returned to step 53 and the cassette size and image size are compared again. After the image was outputted or in the case where it is determined that the papers of the proper size are not set, step 57 follows and a check is made to see if the image information handled at this time is the information of the final page or not (step 57). Unless it is the final page, the next page is processed (step 58) and then the processing routine is returned to step 52 and the operation is repeated. In step 57, when the page handled is the final page, a check is made to see if the images of all pages were completely outputted or not (step 59). If the images of all pages were outputted, the whole sequence is finished. If the outputting of the images of all pages is not finished yet, the pages that are not outputted and the necessary cassette or the like are displayed on the CRT (step 60). The page of the smallest page number among the pages that are not outputted yet is processed (step 61) and the sequence is returned to step 52 and a series of sequence mentioned above is repeated. As described above, by sequentially printing the image information for every image size, the anoyance in exchange of the recording papers during the copying operation can be reduced.

The present invention is not limited to the foregoing embodiment but many modifications and variations are possible within the spirit and scope of the appended claims of the invention.

What is claimed is:

1. An image processing system comprising:
a storage medium for storing image signals of a plurality of originals therein;
input means for designating a desired one of the image signals stored in said storage medium such that the desired one image signal can be read; and
output means for recognizing the size of an original image corresponding to the desired image signal designated by said input means, and for outputting an image size signal indicating the size,
wherein said output means outputs the image size signal in response to the amount of information of the designated image signal.

2. An image processing system comprising:
a storage medium for storing image signals of a plurality of originals therein;
input means for designating a desired one of the image signals stored in said storage medium such that the desired one image signal can be read;
output means outputting an image size signal indicative of a size of an image represented by the image signal designated by said input means;
control means for determining an optimum size of a recording material in response to the image size signal output by said output means; and
display means for displaying the image represented by the image signal designated by said input means,
wherein, in a case where a plurality of image size signals are output by said output means, said control means outputs a plurality of recording materal size signals in response to the plurality of image size signals.

3. An image processing system according to claim 2, further comprising display means for displaying said size of recording material in response to said size of said recording material prior to a recording operation.

4. An image processing system comprising:
a storage medium for storing image signals of a plurality of originals therein;
input means for designating a desired one of the image signals stored in said storage medium such that the desired one image signal can be read;
first output means for outputting an image size signal indicative of a size of the image represented by the image signal designated by said input means;
recording means for recording the designated image signal on a recording material;
second output means for outputting a signal indicative of size of a recording material mounted in said recording means;
control means for determining a plurality of optimum sizes of recording material in response to the plurality of image size signals output by said first output means; and
display means for selecting a size of recording material which is not mounted in said recording means, from among the plurality of recording material sizes determined by said control means and for displaying the selected size.

5. An image processing system according to claim 4, further comprising means for determining an order in which the originals are recorded, in response to the image signals to be recorded on the recording material with the size displayed by said display means.

6. An image processing system according to claim 5, further comprising means for displaying said order.

7. An image processing system according to claim 4, wherein said recording means includes selecting means for automatically selecting an optimum size of recording material in response to the image size signal.

8. An image processing system comprising:
a storage medium for storing image signals of a plurality of originals therein;
input means for designating a desired one of the image signals stored in said storage medium such that the desired one image signal can be read;
output means for recognizing the size of an original image corresponding to the desired image signal designated by said input means, and for outputting an image size signal;
recording means for recording the designated image signal on a recording material; and
second output means for recognizing the size of the recording material and for outputting a recording material size signal of indicative of the size of the recording material,
wherein said recording means performs an enlargement/reduction process on the designated image signal in accordance with the image size signal and the recording material size signal.

9. An image processing system comprising:
a storage medium for storing image signals of a plurality of originals therein;
input means for designating a desired one of the image signals stored in said storage medium such that the desired one image signal can be read;
output means for outputting an image size signal indicative of the size of an image represented by the image signal designated by said input means;
recording means for recording the designated image signal on a recording material; and
control means for controlling said recording means such that, when a plurality of image size signals are output by said output means, an image signal corresponding to a predetermined image size signal from among the plurality of image size signals is primarily recorded.

10. An image processing system according to claim 9, wherein said control means selects an image signal in response to the size of the recording material.

11. An image processing system according to claim 9, wherein said recording means selects, from among a plurality of recording materials, a recording material with a proper size in response to said image size signal.

12. An image processing processing system comprising:
a memory medium in which a plurality of images have been stored;
designating means for designating a desired image among the plurality of images stored in said memory medium;
reading means for continuously reading out an image which is designated by said designating means and which corresponds to a plurality of pages, from said memory medium;
size signal output means for outputting size signals indicative of sizes of images corresponding to respective pages of said designated image; and
printing means for printing an image corresponding to each page of said designated image on a recording material, wherein said printing means includes a selecting means for selecting recording material of a suitable size in response to said size signals.

13. An image processing system according to claim 12, further comprising display means for displaying a sign indicating that a recording material of a suitable size does not exist, when such recording material of a suitable size does not exist.

14. An image processing system according to claim 12, wherein said size signals are stored in said memory medium.

15. An image processing system according to claim 13, wherein, when recording material of a suitable size does not exist, said printing means prints said image on a recording material of another size.

16. An image processing system according to claim 12, wherein said image corresponding to a plurality of pages constitutes a unit file image.

17. An image processing system according to claim 16, wherein said designating means designates a file image.

* * * * *

UNITED STATES PATENT AND TRADEMARK OFFICE
CERTIFICATE OF CORRECTION

PATENT NO. : 4,814,893
DATED      : March 21, 1989
INVENTOR(S): KATSUNORI KATOH

Page 1 of 3

It is certified that error appears in the above-identified patent and that said Letters Patent is hereby corrected as shown below:

Title page:

IN [57] ABSTRACT

Line 7, "recording" (second occurrence) should read
          --a recording--.
  Line 9, "discriminating" should read
          --a discriminating--.

COLUMN 1

Line 32, "file" should read --files--.
  Line 66, "an" should be deleted.

COLUMN 2

Line 62, "bases" should read --base--.

COLUMN 3

Line 52, "photo disc" should read --photodisc--.

COLUMN 4

Line 1, "cables 11" should read --cables 11,--.
  Line 38, "keyboard" should read --keyword--.
  Line 68, "photo disc" should read --photodisc--.

COLUMN 5

Line 3, "then" should read --now--.

UNITED STATES PATENT AND TRADEMARK OFFICE
CERTIFICATE OF CORRECTION

PATENT NO. : 4,814,893

DATED : March 21, 1989

INVENTOR(S) : KATSUNORI KATOH            Page 2 of 3

It is certified that error appears in the above-identified patent and that said Letters Patent is hereby corrected as shown below:

COLUMN 6

Line 1, "The," should read --Then,--.
Line 53, "whichis" should read --which is--.
Line 63, "two." should read --thereto.--.

COLUMN 8

Line 64, "materal" should read --material--.

COLUMN 9

Line 51, "of" (first occurrence) should be deleted.

UNITED STATES PATENT AND TRADEMARK OFFICE
CERTIFICATE OF CORRECTION

PATENT NO. : 4,814,893

DATED : March 21, 1989

INVENTOR(S) : KATSUNORI KATOH

It is certified that error appears in the above-identified patent and that said Letters Patent is hereby corrected as shown below:

COLUMN 10

Line 22, "image processing processing system" should read --image processing system--.

Signed and Sealed this

Twenty-third Day of January, 1990

*Attest:*

JEFFREY M. SAMUELS

*Attesting Officer*     *Acting Commissioner of Patents and Trademarks*